United States Patent [19]

Ito

[11] 4,011,761

[45] Mar. 15, 1977

[54] WHEEL BALANCER

[75] Inventor: Jinichi Ito, Tokyo, Japan

[73] Assignee: Yamada Yuki Seizo Co., Ltd., Japan

[22] Filed: Dec. 22, 1975

[21] Appl. No.: 643,251

[30] Foreign Application Priority Data

Dec. 23, 1974 Japan .............................. 49-147880
Feb. 28, 1975 Japan .............................. 50-25408
Feb. 28, 1975 Japan .............................. 50-25409
Mar. 4, 1975 Japan .............................. 50-26883

[52] U.S. Cl. .................................... 73/462; 73/475
[51] Int. Cl.² ..................... G01M 1/02; G01M 1/22
[58] Field of Search ................. 73/462, , 471, 460, 73/475–477

[56] References Cited

UNITED STATES PATENTS 3,732,737  5/1973  Forster ..................... 73/462
3,813,948  6/1974  Ito ............................ 73/475 X

*Primary Examiner*—James J. Gill
*Attorney, Agent, or Firm*—James E. Nilles

[57] ABSTRACT

A wheel balancer comprising a pair of shafts for supporting a rotary shaft for rotatably mounting a wheel having an amount of unbalance to be measured is disclosed. The supporting shafts are located on a circle having a center which is coincided with a movable instantaneous center of vibration of the wheel and held by a pair of spring members such that the supporting shafts are movable in a direction of a tangent touching the above mentioned circle. The amount of unbalance of the wheel is converted into an electrical signal which is supplied through a calculation circuit to a comparison circuit which can detect the position of the instantaneous center of vibration by means of an indicating means movable in proportional to the amount of movement of the instantaneous center of vibration of the wheel.

10 Claims, 38 Drawing Figures

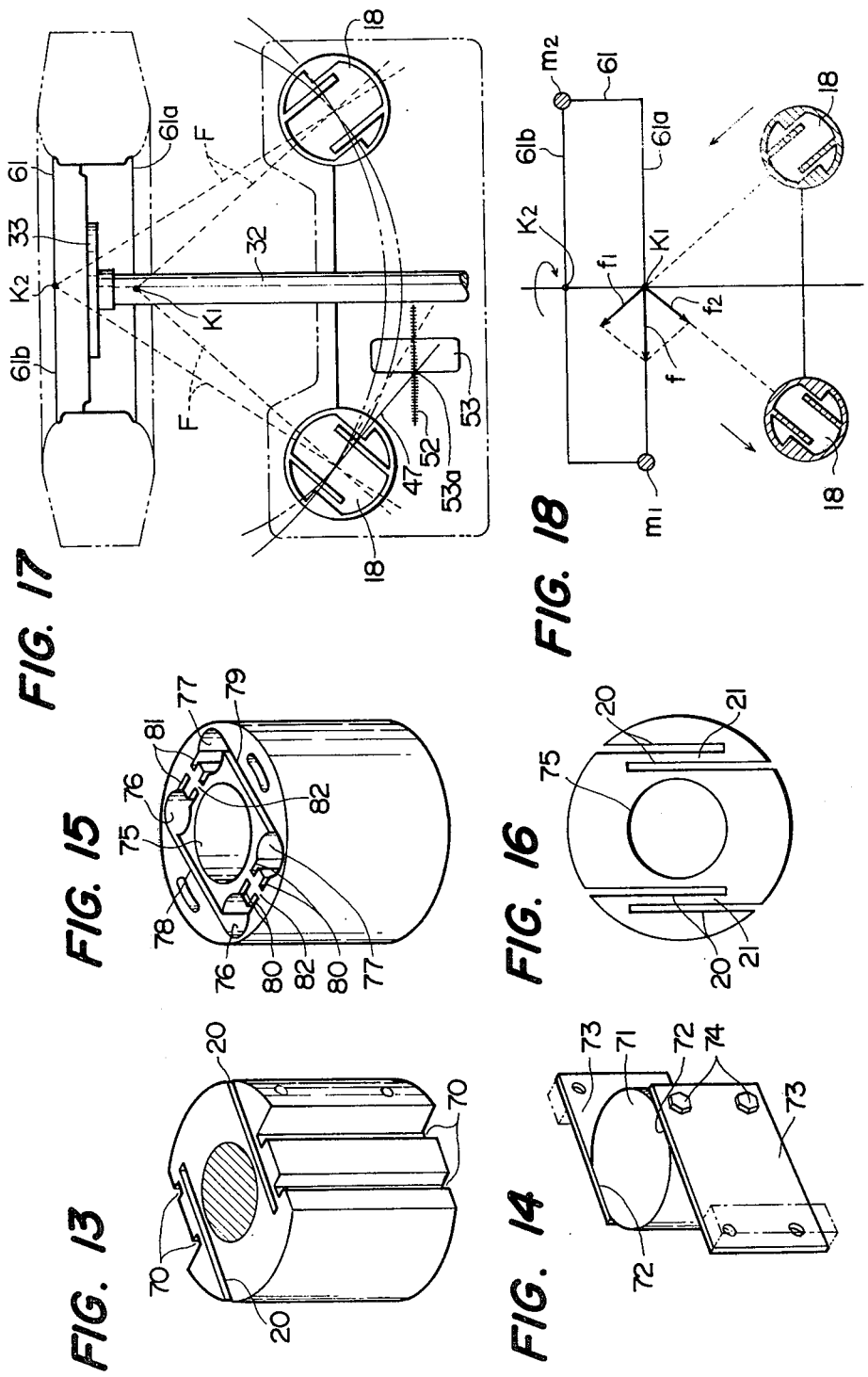

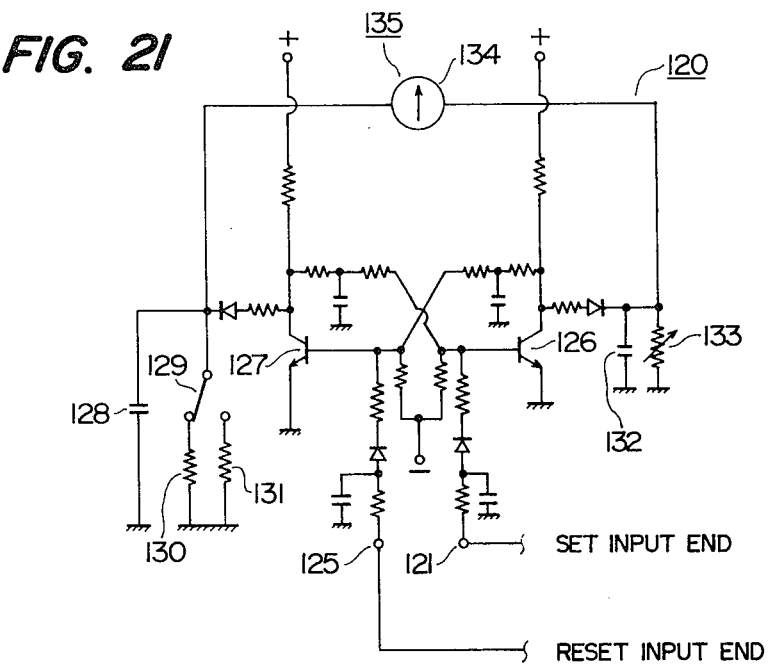
FIG. 21
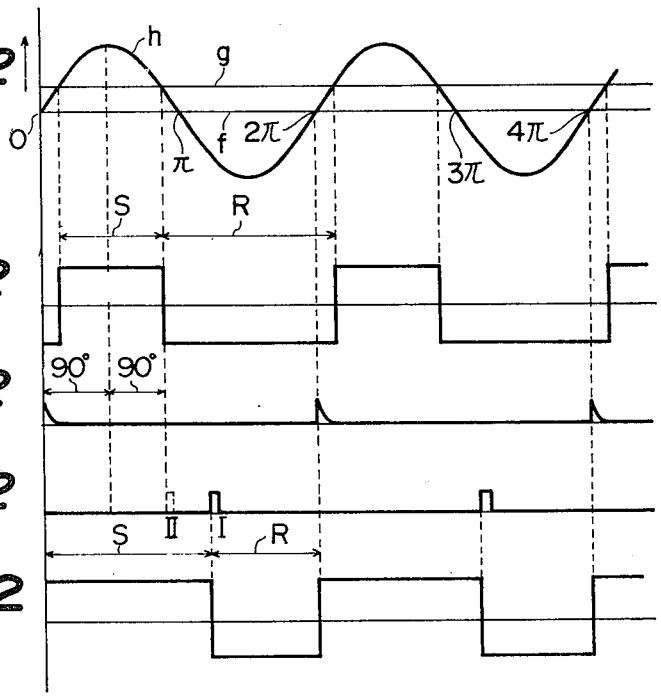
FIG. 22 (a)
FIG. 22 (b)
FIG. 22 (c)
FIG. 22 (d)
FIG. 22 (e)

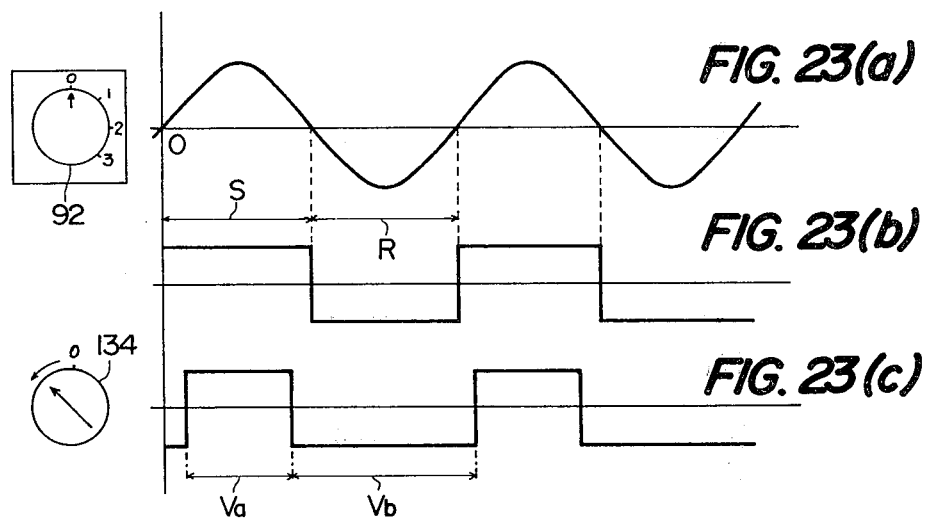
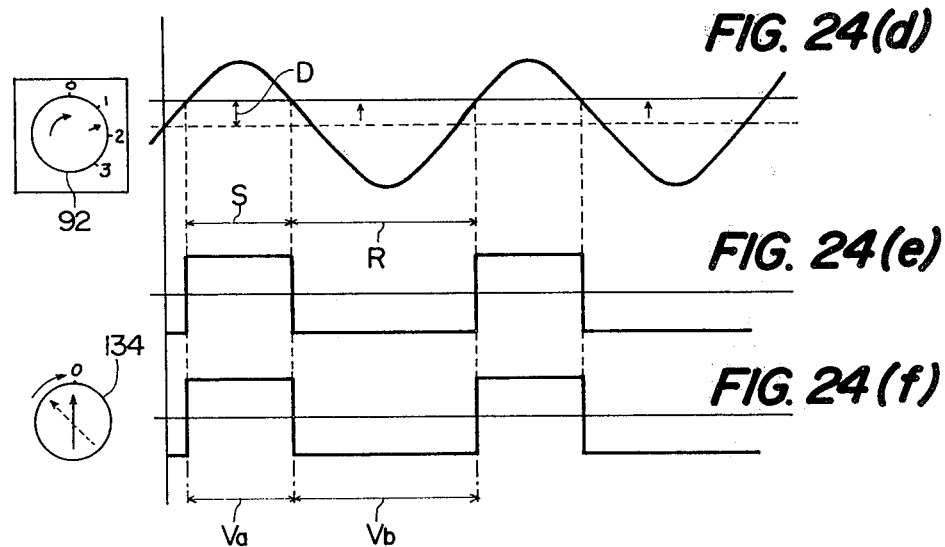

WHEEL BALANCER

This invention relates to wheel balancers and more particularly to a wheel balancer comprising an instantaneous center system which can measure an amount of unbalance at two sides of a wheel removed from vehicles and which is an off-the-car system for measuring balance of the wheel per se.

The wheel balancer according to the invention is constructed such that the wheel is rotatably mounted on a rotary shaft, that an instantaneous center of vibration is movable along the rotary shaft, and the instantaneous center of vibration is alternately set to two sides of the wheel, whereby the amount of unbalance is measured from the amount of vibration of the wheel.

In the wheel balancer according to the invention, the rotary shaft for rotatably mounting the wheel thereon is supported at its opposite sides by a pair of supporting shafts, each of the supporting shafts being held at its diametrically opposed ends by a pair of spring members. The use of pair of spring members instead of one spring member provides the advantage that the spring member can easily be worked and assembled, that if torques for rotating each of the supporting shafts are applied thereto, these torques are cancelled with each other to produce an elastic property which acts in a direction of a tangent touching a circle having a center which is coincided with an instantaneous center of vibration of the wheel without displacing a point where two imaginary lines cross with each other, thereby precisely measuring unbalance of the wheel.

Various kinds of wheel balancer for measuring an amount of unbalance of a wheel have heretofore been proposed. In the balancer which makes use of a simple mechanism, a rotary shaft for mounting a wheel is supported such that the rotary shaft is rockable in one direction only and rotation of the wheel causes the rotary shaft to rock by means of the amount of unbalance of centrifugal force produced. This amount of rocking of the rotary shaft results in detection of the amount of unbalance of the wheel.

In such conventional balancer, in order to detect the amount of unbalance of the wheel, two sides of the wheel are alternately made an instantaneous center of vibration of the wheel and the amount of unbalance at that side of the wheel which is opposed to the instantaneous center of vibration side is made the amount of rocking of the rotary shaft. In order to provide an instantaneous center of vibration for the latter side of the wheel, the instantaneous center of vibration is made movable along the rotary shaft.

In FIG. 1 is shown a conventional wheel balancer which is usable in practice. In the wheel balance shown in FIG. 1, a rotary shaft A is supported by a pair of supporting shafts $B_1$, $B_2$ arranged at both sides of the rotary shaft A. Each of these supporting shafts $B_1$, $B_2$ is rotatably connected to one end of each of links Q, R the other end of which is rotatably supported in a base plate and the like. A point where extensions of the links Q, R cross is located on the rotary shaft A. The supporting shafts $B_1$, $B_2$ and the ends of the links Q, R are arranged on a circle having a center which coincides with the above crossing point. If the rotary shaft A is slightly rocked, the supporting shafts $B_1$, $B_2$ are moved in a direction of a tangent touching a circle Z having a center which coincides with an instantaneous center of vibration $K_1$ which is a point where extensions of the links Q, R cross with each other. A point where two normal lines perpendicular to respective tangents touching the above circle Z cross with each other is always located at the instantaneous center of vibration $K_1$ which is not changed at all. The use of the links Q, R for supporting the rotary shaft A requires a bearing and the like for the purpose of connecting the links Q, R to the supporting shafts $B_1$, $B_2$, respectively, thus resulting in more or less air gaps. In order to prevent error caused by the air gaps, the rotary shaft A is rotated at a high speed on the order of several times higher than a resonant revolution of the wheel balancer shown by dotted lines in FIG. 3, thereby obviating the error caused by the air gaps formed in the bearing.

The wheel balancer shown in FIG. 1, however, has the disadvantage that the rocking position of the rotary shaft A is deviated from the position of the amount of unbalance by 180°, and that the inertia of the wheel causes an error in the measured value.

A wheel balancer has also been proposed to rotate the rotary shaft A at a speed which is on the order of ¼ to ⅓ times slower than the resonant number of revolutions of the wheel balancer. In this balancer, however, the link mechanism could not be used and the supporting shafts $B_1$, $B_2$ are required to be firmly fixed by means of plate springs and the like.

Such conventional wheel balancer is shown in FIG. 2, in which the supporting shafts $B_1$, $B_2$ are held by plate springs C, D, respectively, and both ends of each of these plate springs C, D are made stationary. The instantaneous center of vibration $K_1$ is constituted by a point where extensions of the plate springs C, D in their lengthwise direction cross with each other. If the supporting shafts $B_1$, $B_2$ are located on a circle having a center which coincides with the instantaneous center of vibration $K_1$, elastic direction of the plate springs C, D lies in the widthwise direction thereof. As a result, the supporting shafts $B_1$, $B_2$ are moved along a circle having a center which coincides with the instantaneous center of vibration $K_1$ without changing the position thereof. A component force of centrifugal force produced by the amount of unbalance located at the instantaneous center of vibration $K_1$ is supported by each of the plate springs C, D in its lengthwise direction irrespective of the rocking movement of the rotary shaft A. As a result, it is possible to measure the amount of unbalance at that side of the wheel which is opposed to the side where the vibration center $K_1$ is present.

The wheel balancer shown in FIG. 2 can measure the amount of unbalance of the wheel without inducing error due to the inertia of the wheel, but has the disadvantage that the use of the plate springs C, D aligned with the respective centers of the supporting shafts $B_1$, $B_2$, respectively, and each having stationary ends provides a wheel balancer which is complex in working and assembling and expensive, and that if torque is applied to each of the supporting plates $B_1$, $B_2$ so as to rotate it, the supporting shafts $B_1$, $B_2$ become easily rotated by the torque with the aid of the elastic property of the plate springs C, D, thereby deviating the position of the instantaneous center of vibration and rendering the measurement of the amount of unbalance of the wheel difficult.

An object of the invention, therefore, is to provide a wheel balancer which makes use of a pair of spring members for supporting each of a pair of shafts for rotatably supporting a rotary shaft and arranged at both sides of the rotary shaft, and which can easily be worked and assembled.

Another object of the invention is to provide a wheel balancer which is provided with an indicating means such as an indicating needle adapted to be moved in proportion to the amount of movement of the instantaneous center of vibration so as to measure the instantaneous center of vibration movable along the center axis of the wheel by means of the position of the indicating means, which can easily detect the instantaneous center of vibration which can not be observed by naked eyes, and which can rapidly and precisely measure the amount of unbalance of the wheel.

In such kind of wheel balancers heretofore proposed, use was made of a relay and the like for the purpose of forming the instantaneous center of vibration, so that it was impossible to easily ascertain the position of the instantaneous center of vibration. As a result, the instantaneous center of vibration was measured by drawing it with the aid of a scale formed of metal and the like. Such measurement made the position of the instantaneous center of vibration unclear and was not rapid in operation.

The wheel balancer according to the invention which makes use of the indicating means adapted to be moved in proportion to the amount of movement of the instantaneous center of vibration can easily and rapidly measure the amount of unbalance of the wheel.

In accordance with the invention, provision is made of a calculation circuit and its amplifier circuit for amplifying a minimum input signal to a largest possible extent. The amplification factor of the amplifier circuit is decreased such that a ratio of lengths formed between four points where an amplified wave form of the minimum input signal and a schmidt level cross with each other is equal to a ratio of lengths formed between four points where input signal depending on an amount of vibration of the wheel and the schmidt level cross with each other. Such decrease of the amplification factor permits the amount of unbalance to be detected. As a result, the amplification factor can be increased when use is made of a small input signal containing large noise. Thus, the efficiency of the relay can be improved up to substantially 100%. The wheel balancer according to the invention has the advantage that an obtainment of a signal having a good S/N ratio results in an improvement of measurement accuracy, that provision is made of a variable resistor which does not require any precise operation even when a minute amount of balance of the wheel is measured, and that it is simple in operation and can precisely measure the minute amount of unbalance of the wheel.

In the above described wheel balancer for measuring the amount of unbalance of the wheel by the amount of vibration of the wheel, the variable resistor provided for the calculation circuit is adjusted such that the indicator provided for the comparison circuit of a flip-flop circuit indicates zero and a resistance value of the variable resistor thus adjusted is measured as the amount of unbalance of the wheel. In such conventional calculation circuit, when the amount of vibration of the wheel is minimum, that is, when a minute signal is supplied to the calculation circuit, such signal contains particularly much noise. The filter for removing such noise is very bad in its efficiency when the amplification factor of the amplifier circuit is small, resulting in a bad S/N ratio. In addition, the minute signal supplied to the calculation circuit is small in wave form, so that the amount of displacement of a reference line becomes minute. As a result, even a bit of larger adjustment of the variable resistor results in a deviation of the reference line from the wave form of the input signal to the calculation circuit. The variable resistor, therefore, is required to be strictly adjusted, thereby rendering the measuring operation difficult.

On the contrary, the wheel balancer according to the invention is capable of removing noise included in the input signal having a small amplitude and supplied to the calculation circuit up to substantially 100% and of the improving the S/N ratio.

In the wheel balancer according to the invention, provision is made of a series of circuits and a sine wave or reference wave is applied from a succeeding stage circuit to each preceeding circuit in succession to adjust the variable resistor of each circuit. As a result, the wheel balancer according to the invention can correct temperature drift of each circuit, and can improve correction operating property and overall balancing operation.

In the above described kind of conventional wheel balancers, an operator could not simply correct changes in property caused by inner and outer changes in temperature of the device, so that the device could not continuously be used and hence is not economical.

In accordance with the wheel balancer according to the invention, in order to obviate the above mentioned disadvantage which has been encountered with the conventional wheel balancer, a sine wave or reference wave is supplied to each stage of the calculation circuit and these inputs to each stage of the calculation circuit are compared at a pulse comparison circuit, whereby the drift of each stage of the calculation circuit can easily be corrected.

In the wheel balancer according to the invention, provision is made of a feed back amplifier circuit which can effect its amplifying operation in correspondence with the amount of movement of the instantaneous center of vibration. As a result, it is possible to obtain current or voltage corresponding to the amount of unbalance of various kinds of wheels having different rim widths, respectively, by merely setting the wheel diameter, the width of the wheel rim and the position of the instantaneous center of vibration irrespective of the instantaneous center of vibration, thereby simplifying the measuring operation and the electrical circuit.

In the conventional wheel balancer, the vibration detecting position is constant, so that the centrifugal force produced due to the rotation of the wheel is subjected from that side of the wheel on which is mounted a correcting weight and which coincides with the instantaneous center of vibration to the vibration detecting position side or the side opposed thereto. As a result, different voltages are generated at the vibration detecting part even though the centrifugal force subjected to the vibration detecting position side is the same. That is, the vibration of the wheel produced when the wheel becomes vibrated about the instantaneous center of vibration which coincides with that part of the wheel on which is mounted a correcting weight and which is located at the vibration detecting position side is larger than the vibration produced when the wheel becomes vibrated about the instantaneous center of vibration which coincides with that side of the wheel on which is mounted the correcting weight and which is opposed to the vibration detecting position side. As a result, the value of the amount of unbalance of the wheel thus measured is required to be corrected at both sides of the wheel, thereby rendering correction of the measured value difficult and deteriorating the measurement accuracy of the amount of unbalance of the wheel.

The wheel balancer according to the invention is intended to obviate the above mentioned disadvantage and based on such recognition that a formula for defining a dynamic relation between an instantaneous center of vibration of a rotary shaft on which is mounted a wheel, that side of the wheel on which is mounted a correcting weight and the position of an amount of unbalance detecting part coincides with a gain characteristic in general of a feed back circuit of an electric circuit. The wheel balancer according to the invention is capable of obtaining the amount of unbalance of all kinds of tires as the same electric output of the unbalance, that is, centrifugal force is of the same one by mere by setting a wheel width and a distance from the instantaneous center of vibration of the wheel to the amount of unbalance detecting part for the wheel having the same diameter.

The invention will now be described in greater detail with reference to the accompanying drawings, wherein:

FIGS. 1 and 2 diagrammatically illustrate a conventional principle of supporting a wheel, respectively;

FIG. 3 is a graph showing an amplitude of a rotary wheel for mounting a wheel as a function of number of revolutions of the rotary wheel;

FIG. 4 diagrammatically illustrates a principle of detecting an amount of unbalance of a wheel according to the invention;

FIGS. 5 and 6 diagrammatically illustrate two embodiments of the wheel balancer according to the invention, respectively;

FIGS. 7($a$) and 7($b$) diagrammatically illustrate the principle according to the invention, respectively;

FIGS. 8($a$) and 8($b$) diagrammatically show a feed back amplifier circuit and non-inversion amplifier circuit according to the invention, respectively;

FIG. 10($a$) is a perspective view of one spring and its retaining means shown in FIG. 10.

FIGS. 13, 14 and 15 are perspective views showing various modified embodiments of a spring member usable for the wheel balancer according to the invention, respectively;

FIG. 16 is a plan view showing another modified embodiment of the spring member usable for the wheel balancer according to the invention;

Figure 19:
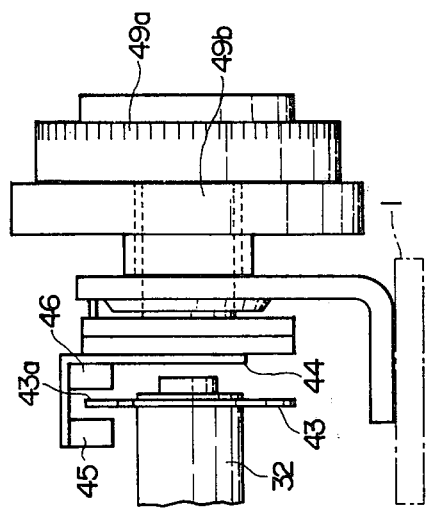
Figure 20:
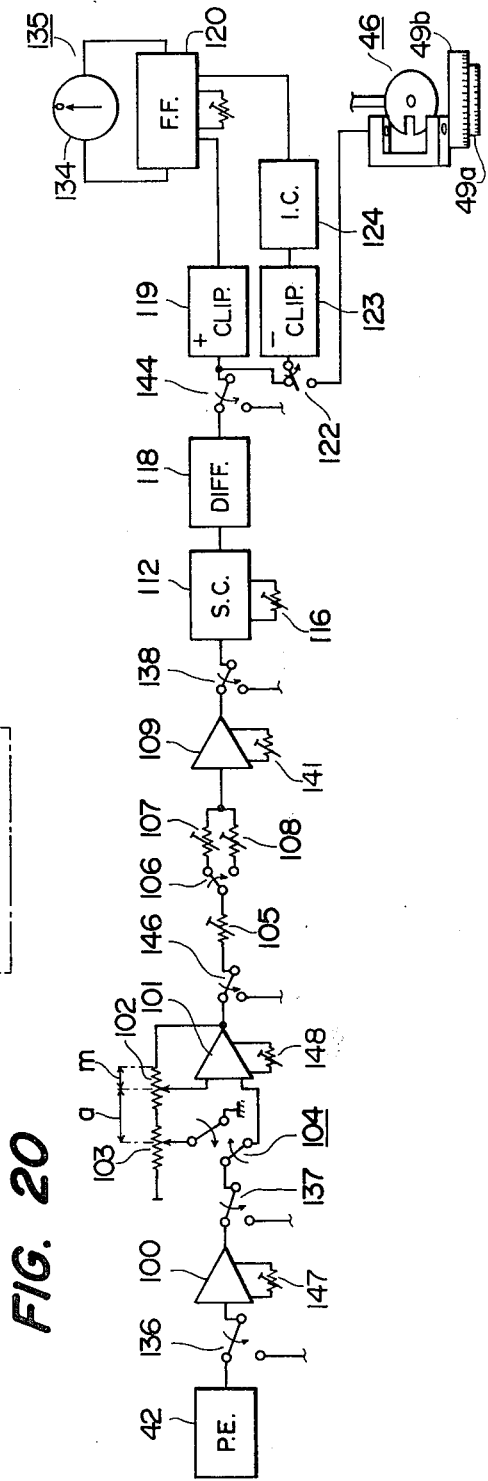
Figure 25:
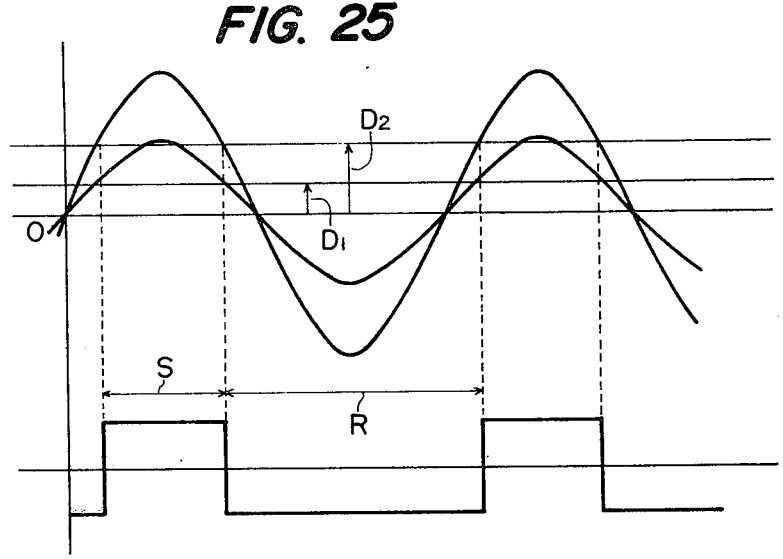
Figure 26:
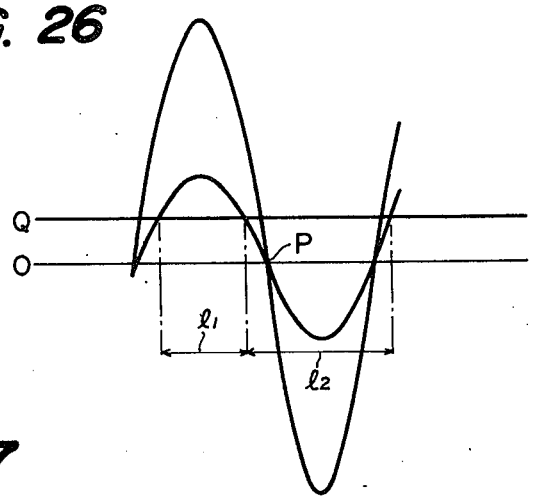
Figure 27:
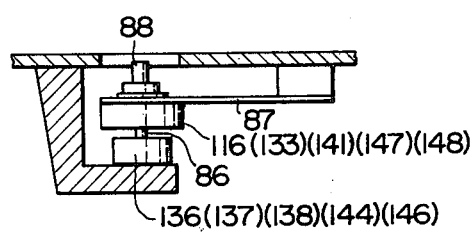

FIGS. 17 and 18 diagrammatically illustrate successive operations of the wheel balancer according to the invention;

FIG. 19 is a cross-sectional view showing an unbalanced phase detection operating part usable for the wheel balancer according to the invention;

FIG. 20 is a block diagram showing an electric circuit usable for the wheel balancer according to the invention;

FIG. 21 shows in detail a flipflop circuit shown in FIG. 20;

FIGS. 23($a$) through 23($c$) and FIGS. 24($d$) through 24($f$) illustrating the principle of the wheel balancer according to the invention;

FIGS. 23 and 24 are wave form diagrams illustrating a process of detecting the amount of unbalance, respectively;

FIG. 25 is a wave form diagram illustrating dimension of the amount of unbalance;

FIG. 26 is a wave form diagram illustrating dimension of the amount of unbalance similarly to FIG. 25; and FIG. 27 is a cross-sectional view showing a change-over switch usable for the wheel balancer according to the invention.

Figure 4:
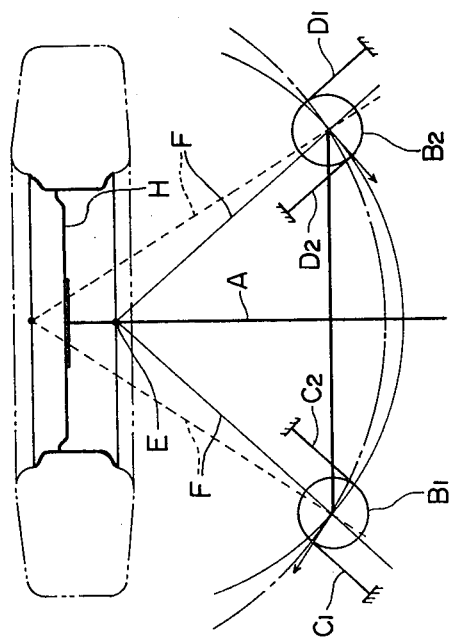

A principle of detecting an amount of unbalance of a wheel according to the invention will now be described with reference to FIG. 4.

A rotary shaft A is supported by a pair of supporting shafts $B_1$, $B_2$ arranged symmetrically at both sides of the rotary shaft A with respect thereto. Provision is made of a pair of plate springs $C_1$, $C_2$ and $D_1$, $D_2$, one end of each pair of plate springs being secured to one of diagrammatically opposite ends of each of the supporting shafts $B_1$, $B_2$ and arranged parallel with each other and free ends of each pair of plate springs $C_1$, $C_2$ and $D_1$, $D_2$ being secured to a base plate of the device and made stationary.

A point E where parallel extensions of imaginary lines F, F passing through intermediate points between the plate springs $C_1$, $C_2$; $D_1$, $D_2$ cross with each other is made movable along a center axis of the rotary shaft A. The centers of the supporting shafts $B_1$, $B_2$ are located on a circle having a center which coincides with the cross point E.

If the rotary shaft A is rocked, the rotary shaft A begins its rocking movement about the cross point E where the imaginary lines F, F cross with each other. The supporting shafts $B_1$, $B_2$ are moved in directions of tangents touching a circle having its center which coincides with the cross point E. The imaginary lines which are normal lines perpendicular to these tangents always pass through the center E which is not moved.

If a torque is subjected to the supporting shafts $B_1$, $B_2$ so as to rotate them, distances between the centers of the supporting shafts B, B and the plate springs $C_1$, $C_2$ cause the torque to act upon the plate springs $C_1$, $C_2$ such that the plate springs $C_1$, $C_2$ are subjected to tension or compression so as to cancel the torque. As a result, the supporting shafts $B_1$, $B_2$ are not rotated, but move only in directions of tangents touching the circle having its center which coincides with the instantaneous center of vibration E of the imaginary lines F, F. Thus, it is possible to precisely measure the amount of unbalance of the wheel without moving the instantaneous center of vibration E.

A principle of detecting the instantaneous center of vibration of the wheel balancer according to the invention will now be described with reference to FIG. 5.

On one end of the rotary shaft A is mounted a wheel H. Imaginary lines F, F in those directions which are acted upon by the supporting shafts $B_1$, $B_2$ cross at instantaneous centers of vibration $K_1$, $K_2$, respectively. These instantaneous centers of vibration $K_1$, $K_2$ are alternately moved on the axis of the rotary shaft A toward two sides of the wheel H. Such movement of the instantaneous centers of vibration $K_1$, $K_2$ is effected by synchronously rotating the supporting shafts $B_1$, $B_2$.

To one of the supporting shafts $B_1$ is secured a pointing needle L as an indicating means, the indicating needle L extending in parallel with the imaginary line F which can not be seen by naked eyes.

Then, provision is made of a reference line M located between the rotary shaft A and the supporting shaft $B_1$ and extending in parallel with the rotary shaft A.

Let a distance from a point where the reference line M and a line connecting the centers of the supporting shafts $B_1$, $B_2$ cross to the center of the supporting shaft $B_1$ be a and let a distance from a point where the rotary shaft A and the line connecting the centers of the supporting shafts $B_1$, $B_2$ cross to the center of the supporting shaft $B_1$ be b. Let points where the reference line M and the indicating needle L cross with each other be N, P, respectively. A triangle having three sides $\overline{b}$, $\overline{A}$, $\overline{F}$ and another triangle having three sides $\overline{a}$, $\overline{M}$, $\overline{F}$ will now be taken into consideration. These two triangles are homologous triangles since two interior angles thereof are equal with each other. As a result, the two sides $K_1$, $K_2$ of the wheel H are represented by the points N, P where the reference line M and the indicating needle L cross with each other and $\overline{NP} : \overline{K_1K_2}$ is given by $\overline{NP} : \overline{K_1K_2} = a : b$.

As a result, the length of $\overline{NP}$ can be determined by the known width $\overline{K_1K_2}$ of the wheel H times $a/b$. If the length of $\overline{NP}$ thus determined is graduated on the reference line M, the width $\overline{K_1K_2}$ can be indicated on the reference line M as a width $\omega$ of the wheel H. If one side of the wheel H, which can easily be known from that position of the rotary shaft A on which is mounted the wheel H, the other side of the wheel H can immediately be measured with the aid of the indicating needle L.

Figure 1:
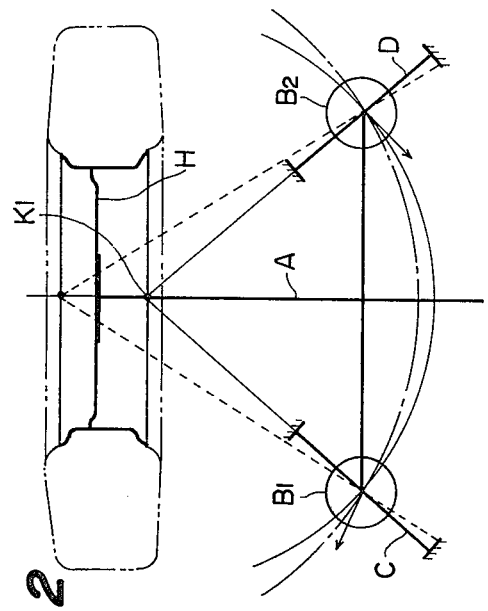
Figure 2:
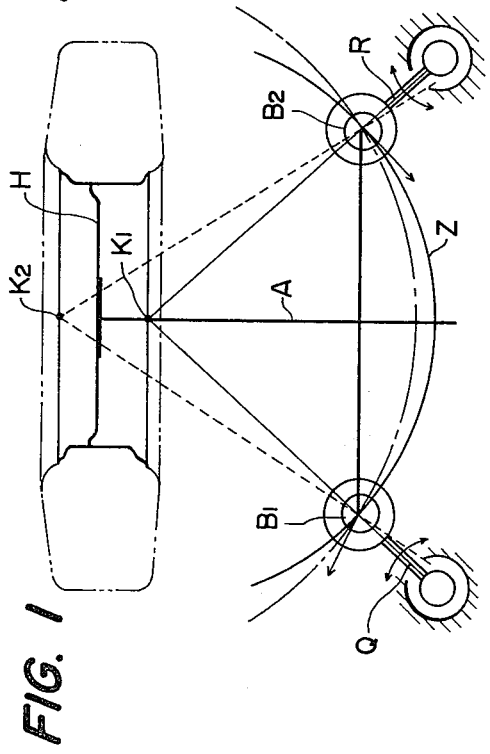
Figure 3:
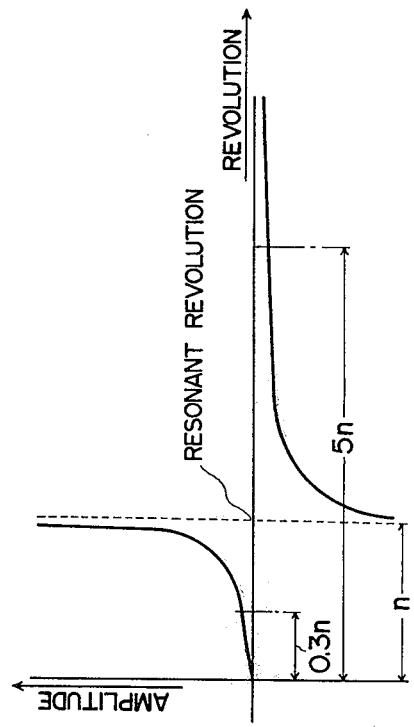
Figure 5:
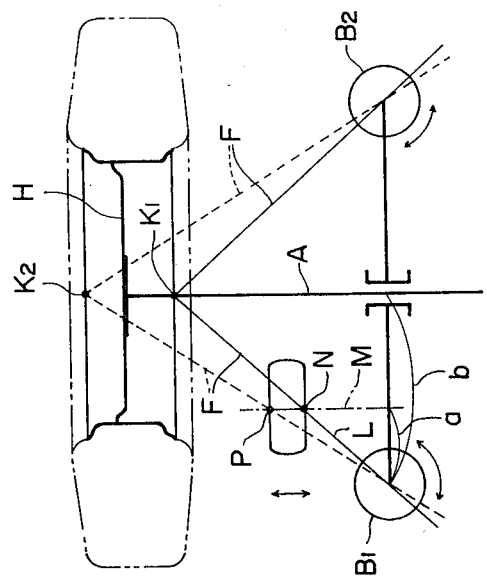

In the embodiment shown in FIG. 5, the indicating needle L is located at the same side as the imaginary line F. In this construction, a space formed between the supporting shaft $B_1$ and the wheel H is narrow, so that it is impossible to locate the indicating needle L therein. In addition, the operator can not observe the indicating needle L without difficulty.

Figure 6:
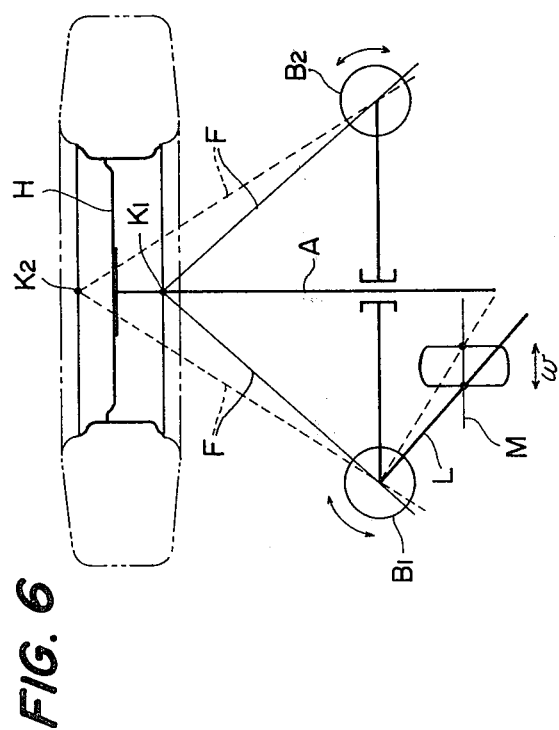

In FIG. 6 is shown another embodiment of the wheel balancer according to the invention. In the present embodiment, the indicating needle L is made perpendicular to the imaginary line F and the reference line M is made in parallel with the line extending between the supporting shafts $B_1$, $B_2$. That is, the construction shown in FIG. 6 is provided by rotating the indicating needle L and the reference line M shown in FIG. 5 by 90° in a clockwise direction. The rotating angle of the supporting shaft $B_1$ of the construction shown in FIG. 6 is the same as the rotating angle of the supporting shaft $B_1$ of the construction shown in FIG. 5, so that it is possible to indicate the width $\omega$ of the wheel H on the reference line M.

As seen from the above, in accordance with the invention, provision is made of a model wheel reduced in scale of the wheel H and the position of the model wheel is brought into in coincidence with the position of the wheel H with the aid of the indicating needle L so as to ascertain the instantaneous center of vibration $K_1$ or $K_2$.

The principle of the invention will now be described with reference to FIGS. 7(a), 7(b) and 8(a), 8(b).

Figure 7:
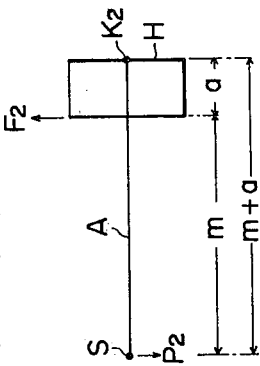
Figure 7:
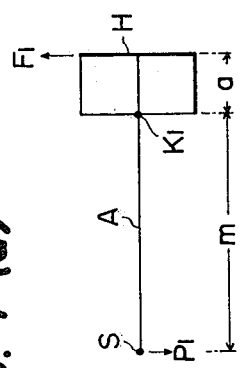

In a wheel balancer in which a wheel is rotated and subjected to vibration in one direction only and the amount of unbalance of the wheel is detected by the amount of vibration, if the rotary shaft A on one end of which is mounted the wheel H is subjected to vibration about the instantaneous center of vibration $K_1$ at one side of the rim of the wheel H as shown in FIG. 7(a), a relation between centrifugal force $F_1$ subjected to the wheel H and vibration $P_1$ of a vibration detecting part S located at another end of the rotary shaft A is given by $$a F_1 = m P_1 \quad (1)$$

$$P_1 = \frac{a}{m} F_1 \quad (2)$$

where m is a distance from the vibration detecting part S to the instantaneous center of vibration $K_1$ and a is a rim width of the wheel H.

In addition, if the rotary shaft A is subjected to vibration about the instantaneous center of vibration $K_2$ at another side of the rim of the wheel H, a relation between centrifugal force $F_2$ subjected to the wheel H and vibration $P_2$ of the vibration detecting part S is given by $$a F_2 = (m + a) P_2 \quad (3)$$

$$P_2 = \frac{a}{(m + a)} F_2 \quad (4)$$

As a result, even though the centrifugal forces $F_1$, $F_2$ are equal, the vibration $P_1$ is larger than the vibration $P_2$, i.e.

$$P_1 > P_2 \quad (5)$$

As seen from the above equation (5), even though the centrifugal forces $F_1$, $F_2$ are equal, that is, the amounts of unbalance are equal with each other, different voltages or currents are generated at the vibration detecting part S.

From the above equation (1), $$F_1 = \frac{m}{a} P_1 \quad (6)$$

From the above equation (3), $$F_2 = \frac{a + m}{a} P_2 \quad (7)$$

From the constructional relation of the wheel balancer $$m > a \quad (8)$$

As a result, if coefficients $m/a$ and $a + m/a$ defined by the above equations (6) and (7), respectively, are amplified in response to conversion of the centers $K_1$, $K_2$, the same voltages or currents are generated at the vibration detecting part S when the centrifugal forces $F_1$, $F_2$ are equal with each other.

Figure 8:
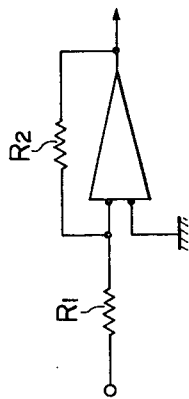
Figure 8:
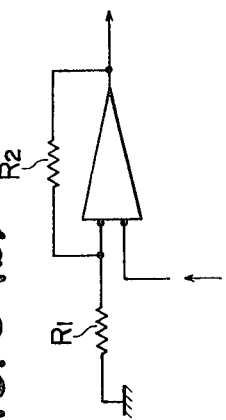

In an inversion amplifier circuit in which input to and output from a negative feed back amplifier circuit are opposite in phase as shown in FIG. 8(a), its gain characteristic is given by $$A = -\frac{R_2}{R_1} \qquad (9)$$

In a non-inversion amplifier circuit which input to and output from a negative feed back amplifier circuit are in phase as shown in FIG. 8(b), its gain characteristic is given by $$A = \frac{R_1 + R_2}{R_1} \qquad (10)$$

As seen from comparison between the above equations (6), (7) and (9), (10), the coefficient $m/a$ derived from the above equation (6) is similar to the gain characteristic $-R_2/R_1$ of the inversion amplifier circuit of the feed back amplifier circuit, while the coefficient $m + a/a$ derived from the above equation (7) is similar to the gain characteristic $R_1 + R_2/R_1$ of the non-inversion amplifier circuit of the feed back amplifier circuit.

As a result, it is possible to obtain an electric output in response to the amount of unbalance of the wheel by corresponding the above mentioned distance $m$ to the resistance value $R_2$, by corresponding the above mentioned rim width $a$ of the wheel H to the resistance value $R_1$ and by feeding back and amplifying the electric output generated at the vibration detecting part with the aid of the inversion amplifier circuit or the non-inversion amplifier circuit of the negative feed back amplifier circuit adapted to be changed over in response to change of the center of vibration at the two sides of the wheel.

Now, one embodiment of the wheel balancer according to the invention will be described with reference to FIGS. 9 to 12.

Provision is made of a pair of shafts 2, 2 secured to one side of a horizontal base plate 1 and spaced apart from each other. Each of the shafts 2, 2 is provided at its upper end with a flange-shaped flat surface to which is fixed a brake shoe 3 formed of material having a high friction coefficient.

Into each of the shafts 2, 2 is rotatably inserted a fastening tube 4 whose outer diameter is equal to the inner diameter of the shaft 2. The fastening tube 4 is provided at its upper end with an instantaneous center of vibration change-over body 6 formed of a spring receiving body 5. The spring receiving body 5 is conical in shape and has a diameter which is larger than the outer diameter of the fastening tube 4. The spring receiving body 5 is closely fitted to the brake shoe 3 of the shaft 2. The fastening tube 4 is provided at its lower end with threads 7 threadedly engaged with an annular nut 8 which is made stationary by urging the spring receiving body 5 against the brake shoe 3. To the nut 8 is secured a lever 9 for easily rotating the nut 8.

One of the spring receiving bodies 5 is provided at its outer periphery with a gear 10 threadedly engages with a pinion 12 secured to a handle 11 rotatably journalled in the base plate 1. Rotation of the handle 11 results in a rotation of the spring receiving body 5. The instantaneous center of vibration changing bodies 6, 6 are provided at their lower sides with interlocking rods 13, 13 projecting from the outer periphery thereof in opposed directions. The interlocking rods 13, 13 are provided at their front ends with gears 14, 14, respectively, threadedly engaged with each other. As a result, if one of the instantaneous center of vibration changing bodies 6, 6 is rotated, the other instantaneous center of vibration changing body 6 becomes rotated by the same angle in an opposite direction.

The above mentioned spring receiving body 5 is provided at its center with a bore 15 extended theretrhough and provided at its inner wall with a pair of ridges 16, 16 extending in a lengthwise direction of the bore 15 and arranged at diametrically opposite position of the bore 15, respectively. The spring receiving body 5 is also provided with tapped holes 17 extending through the ridges 16, respectively. Into the bore 15 is inserted a spring supporting body 18 formed of an elastic material. The spring supporting body 18 is provided at its upper surface with a supporting shaft 19 having at its front end a thread 19a. The spring supporting body 18 is provided at its diametrically opposite positions with a pair of slit shaped-grooves 20, 20 spaced from the center of the body 18 by the same distance and extending in parallel with each other. The body 18 is provided along its lengthwise direction a pair of L-shaped notches so as to provide a pair of reduced thickness portions 21, 21 each formed between the groove 20 and the L-shaped notch and constituting a spring member. Each of these reduced thickness portions 21 constituting the spring member is provided with tapped holes 22 extending therethrough. The spring supporting body 18 inserted into the bore 15 of the instantaneous center of vibration changing body 6 is secured thereto by means of bolts 23 threadedly engaged with the tapped holes 17 and 22. The ridges 16, 16 of the instantaneous center of vibration changing body 6 serves to space apart the spring supporting body 18 from the inner wall of the bore 15 by a distance defined by the height of the ridges 16, 16 to form a gap G (FIG. 12) which permits the spring supporting body 18 to freely rock.

The supporting shaft 19 of the spring supporting body 18 is rotatably journalled in bearings 24, 24 secured to the spring receiving body 5 by means of a nut 25. These bearings 24, 24 are fitted in bearings 26, 26, respectively, and connected with each other through a rocking body 27 of monocock construction. Opposed to one of the supporting rods 19, 19 is arranged an indicating needle 47 as an indicating means whose base portion is secured to the supporting rod 19 by means of a nut 48 threadedly engaged with the upper thread portion 19a of the supporting rod 19.

The rocking plate 27 is composed of a vertical shaft supporting plate 28 and a triangle-shaped horizontal reinforcing plate 29 extending rearwardly from the vertical shaft supporting plate 28. The rocking body is provided with a bearing tube 30 having one end projecting in a direction perpendicular to the shaft supporting plate 28 and another end adapted to be located at the top portion of the triangle-shaped reinforcing plate 29. The bearing tube 30 is rotatably journalled at its front and rear ends in bearings 31, 31, respectively. A rotary shaft 32 for rotatably mounting a wheel thereon is rotatably journalled in the bearings 31, 31. The center axis of the rotary shaft 32 is aligned with a vertical bisecting line located between the spring supporting bodies 18, 18 and extending in a direction perpendicular to the latter.

To that end of the rotary shaft 32 which is located at the side of the shaft supporting plate 28 is secured a wheel mounting disc 33. The rotary shaft 32 is also provided with a pulley 34 for connecting the rotary shaft 32 through a belt to a driving motor.

To the rear end of the reinforcing plate 29 of the bearing tube 30 is secured a semi-circular balancing member 35. To this balancing member 35 is secured one end of a plate spring 37 whose lower end is secured to an L-shaped tension piece 36. The lower end of the L-shaped tension piece 36 is secured to the base plate 1. To one of the vertical legs of the tension piece 36 is secured an adjustable piece 38 whose front end is bent so as to be opposed to the rear end of the balancing member 35. An adjustable screw 39 having a round front end is threadedly engaged with the adjustable piece 38 and is adjusted such that the screw 39 makes contact with the center portion of the plate spring 37 to urge it against the plate spring 37. The L-shaped tension piece 36 is provided at its vertical leg with a horizontal opening 40. Between the balancing member 35 and the tension piece 36 is sandwiched a prizoelectric element 42 by means of a bolt 41 having a diameter which is smaller than the opening 40 and threadedly engaged with the balancing member 35.

To the rear end of the rotary shaft 32 is secured a phase detecting plate 43 provided at a part of its outer periphery with a notch 43a as shown in FIG. 19.

Provision is made of a U-shaped phase angle 44 opposed to the phase detecting plate 43 and made co-axially rotatable with the rotary shaft 32 by means of a phase dial 49a. The phase detecting plate 43 is disposed between a light projecting part 45 and a light receiving part 46, both parts 45, 46 being supported by the phase angle 44. The phase dial 49a is provided at its inside with a memory dial 49b which can rotate independently of the phase dial 49a.

Figure 9:
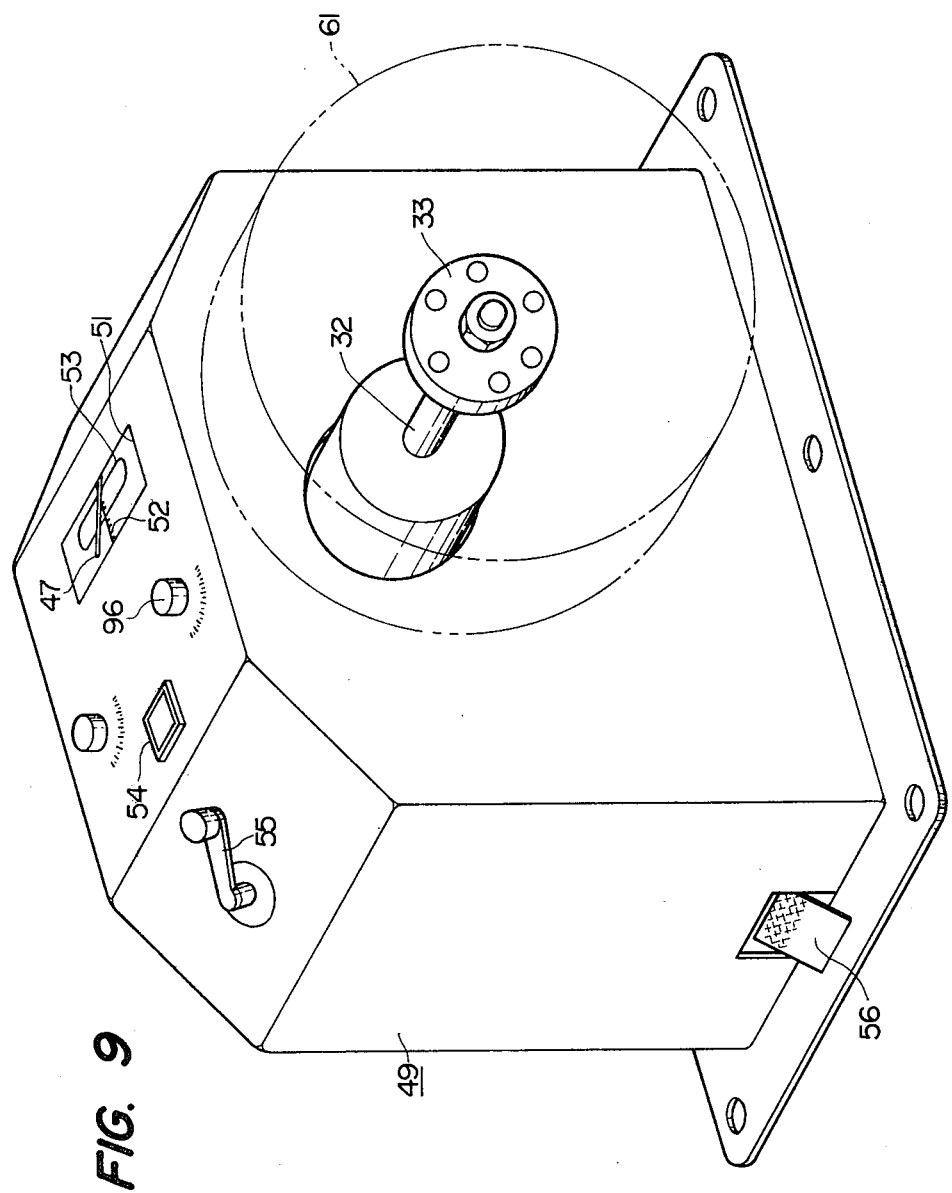
FIG. 9 is a perspective view showing one embodiment of the wheel balancer according to the invention.
Figure 12:
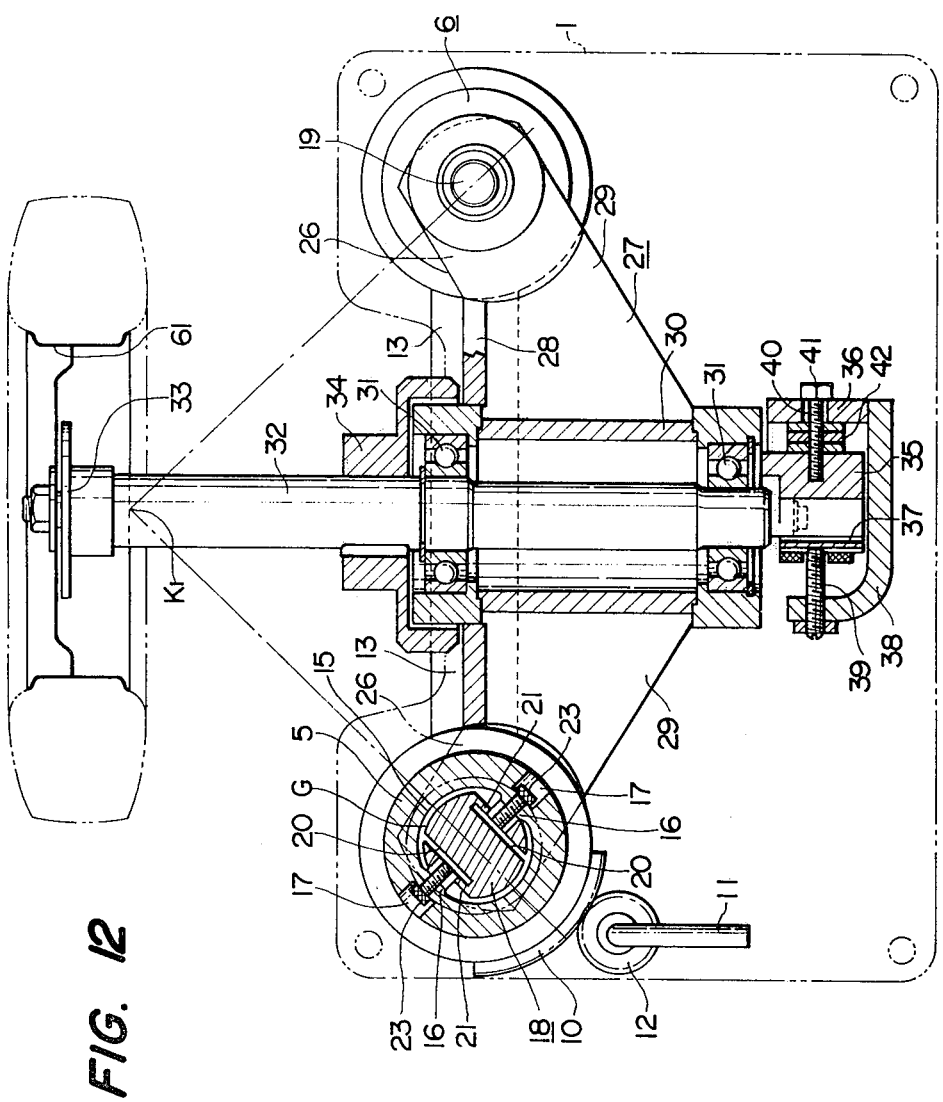
FIG. 12 is a plan view of the wheel balancer shown in FIG. 9, with a part of the essential parts thereof being broken away.

The appearance of the wheel balancer according to the invention will now be described with reference to FIGS. 9 and 12. In a trapezoid-shaped casing 49 is horizontally mounted the base plate 1. From one side of the casing 49 is projected the rotary shaft 32 to the front end of which is secured the wheel mounting disc 33. The casing 49 is provided at its upper surface with a transparent window 51 to which is opposed the indicating needle 47 adapted to be associated with a graduated scale 52 and a model wheel 53. The casing 49 is further provided at its upper surface with a meter 54 such as a gram dial, zero scale indicator and the like.

Figure 10:
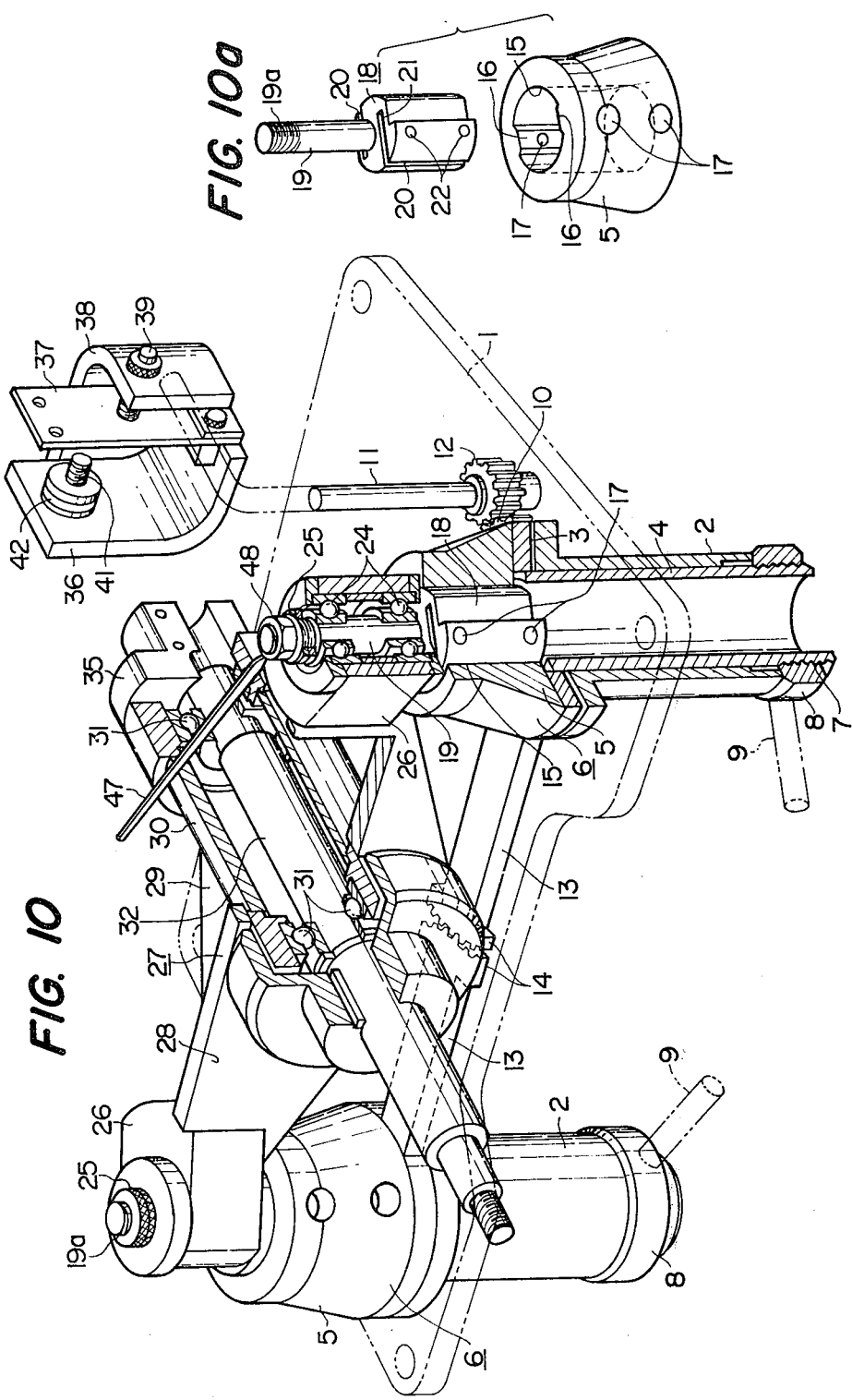
FIG. 10 is a perspective view showing the wheel balancer shown in FIG. 9, with a part of the essential parts thereof being broken away.
Figure 11:
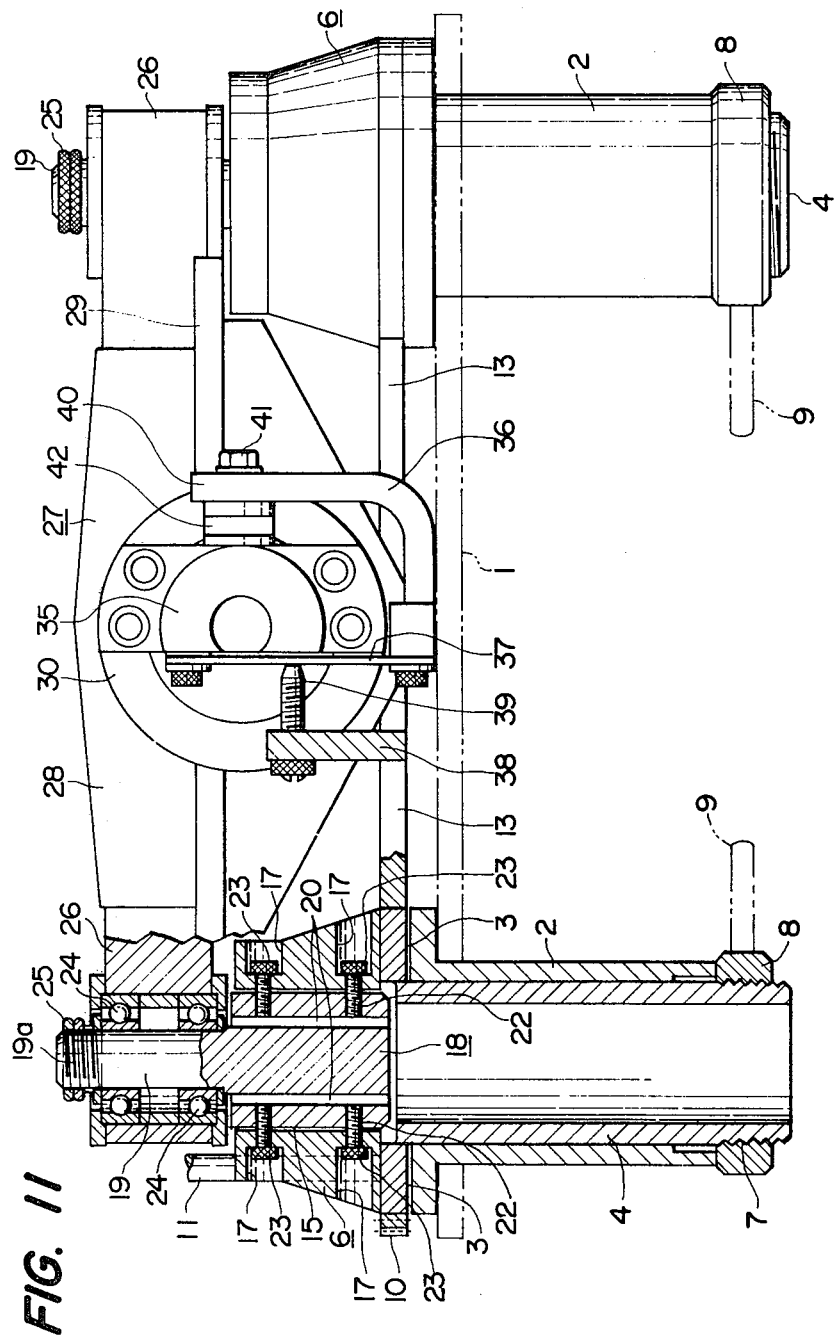
FIG. 11 is a front elevational view of the wheel balancer shown in FIG. 9, with a part of the essential parts thereof being broken away.

In addition, the casing 49 is provided at its one side with a crank 55 for rotating the handle 11 shown in FIG. 10 and a pedal 56 for rotating the lever 9 shown in FIG. 10 for the purpose of loosing the screw 8.

The above mentioned embodiment of the wheel balancer according to the invention will operate as follows.

If the wheel 61 whose amount of unbalance is to be measured is mounted on the wheel mounting disc 33, the weight of the wheel 61 is supported by the spring supporting bodies 18, 18. At the same time, the rear part of the rocking body 27 causes the plate spring 37 to be subjected to tension to support the rotation of the rotary shaft 32 caused by the rotation of the rocking body 27 due to the weight of the wheel 61. In addition, the rear part of the rocking body 27 serves to prevent the reduced thickness portions 21, 21 of the spring supporting bodies 18, 18 from being subjected to excessive force such as torsional force and the like.

If the rotary shaft 32 is rotated by a motor and the like (not shown) through the belt and pulley 34, the wheel 61 becomes rotated. If the amount of unbalance is present at a part of the wheel 61, the wheel 61 is subjected to vibration. Since the wheel 61 is rotatably journalled in the rocking body 27 which is held by the spring supporting bodies 18, 18, only horizontal vibration is subjected to the wheel 61. As a result, the wheel 61 and the rocking body 27 begin to be rocked in a horizontal direction. This horizontal rocking movement of the rocking body 27 is subjected to the reduced thickness portions 21, 21 of the spring supporting bodies 18, 18 to resiliently bend these reduced thickness portions 21, 21 in a direction perpendicular to the grooves 20 without bending them in a direction parallel with the grooves 20.

During the rocking movement of the rocking body 27, if the fastened nuts 8, 8 are loosened by operating the pedal 56 and hence rotating the levers 9, 9, the brake shoes 3, 3 are released from the lower part of the spring receiving bodies 5, 5 to allow the instantaneous center of vibration changing bodies 6, 6 to be freely rotated. Then, the crank 55 is rotated to rotate the handle 11, thereby rotating through the pinion 12 and gear 10 one of the instantaneous center of vibration changing bodies 6, 6. Meantime, the other instantaneous center of vibration changing body 6 is rotated in an opposite direction by the same angle through one of the interlocking rod 13, gears 14, 14 and another interlocking rod 13. If both the instantaneous center of vibration changing bodies 6, 6 are rotated, the supporting shaft 19 together with the bearing 26 are smoothly rotated by means of the bearing 24. In this case, the spring supporting bodies 18, 18 are also rotated. As a result, the instantaneous center of vibration $K_1$ which coincides with the point where the imaginary lines F, F extending in the same direction as the grooves 20, 20 of each of the spring supporting bodies 18, 18 cross with each other is moved along the center axis of the rotary shaft 32 At the same time, the indicating needle 47 secured to the spring supporting body 18 is also rotated to located the instantaneous center of vibration $K_1$ where the imaginary lines F, F in the direction in which forces are acted upon the grooves 20, 20 cross with each other at one side of the rim of the wheel 61 as shown in FIG. 17.

If the lever 9 is rotated to fasten the nut 8, the fastening tube 4 is pushed downwardly so as to urge the spring receiving body 5 against the brake shoe 3, thereby making the instantaneous center of vibration changing the body 6 stationary, The centers of the spring supporting bodies 18, 18 are located on the circle having its center at the side $K_1$ of the wheel 61. The supporting shafts 19, 19 of the spring supporting bodies 18, 18 can only move in the direction of the tangent touching the circle with the aid of reduced thickness portions 21, 21 but could not move in the direction of the imaginary line F, and as a result, the point $K_1$ where the imaginary line F and the center axis of the rotary shaft 32 cross with each other does not move from the center of the circle. Thus, the instantaneous center of vibration of the rotary shaft 32 is normally located at the point $K_1$.

Now, let it be assumed that an amount of unbalance $m_i$ is present at that side of the wheel 61 at which the instantaneous center of vibration $K_1$ is located, while an amount of unbalance $m_2$ is present at that side of the wheel 61 at which the instantaneous center of vibration $K_2$ is located as shown in FIG. 18. If the wheel 61 is rotated, the wheel 61 begins it vibration due to the centrifugal force acting upon each of these amounts of unbalance $m_1$, $m_2$. The centrifugal force due to the amount of unbalance $m_1$ acts as a force f whose components of force $f_1$ and $f_2$ are aligned with the imaginary lines, respectively. Both of these components of force $f_1, f_2$ act in directions in parallel with the grooves 20, 20 of the spring supporting bodies 18, 18 so as to extend or contract the reduced thickness portions 21, 21. At this time, the reduced thickness portions 21, 21 are not bent or rocked. As a result, the rocking movement of the rocking body 27 is effected by the amount of unbalance $m_2$ only which is present at outside rim 61b of the wheel 61. In this case, the amount of unbalance $m_1$ is irrelevant to the rocking movement of the rocking body 27. That is, the amount of rocking movement of the rocking body 27 is equal to the amount of unbalance $m_2$. In the case of measuring the amount of unbalance $m_2$, the rotary shaft 32 is rotated at a revolution which is 30% the resonance number of revolutions. The rotary shaft 32 is controlled such that the rotary shaft 32 is always rotated at a constant number revolutions for the purpose of measuring amounts of unbalance which are different from each other in dependence with kinds and dimensions of the wheel.

The rocking body 27 is firmly connected through the spring supporting bodies 18, 18 to the shafts 2, 2, respectively, so that the resonant number of revolutions is higher than that of the conventional wheel balancer in which the rocking body is made freely rockable by means of links and the like. As a result, the wheel balancer according to the invention is capable of rocking the rocking body 27 by the vibration force produced by the amount of unbalance of the wheel 61 which is rotated at a lower speed.

The rocking movement of the rocking body 27 due to the wheel 61 also causes the bearing tube 30 and the balancing member 35 to rock. As a result, the piezoelectric element 42 touching the balancing member 35 is subjected to the vibration of the latter to generate an electric signal which corresponds to the vibration of the balancing member 35.

The piezoelectric element 42 generates an electromotive forge which is proportional to the amount of compression subjected to it. If the amount of compression is smaller than 0, that is, if an air gap is formed between the balancing member 35 and the piezoelectric element 42, the sine wave electromotive force is not generated. As a result, the adjustable screw 39 is rotated to urge it against the plate spring 37. The plate spring 37 is normally urged through the balancing member 35 against the piezoelectric element 42. Thus, regardless the rocking movement of the balancing member 35, the plate spring 37 urges against the piezoelectric element 42 so as to generate always a voltage from the piezoelectric element 42.

As described with reference to FIG. 18, if the rotary shaft 32 is vibrated about the instantaneous center of vibration $K_1$ located at one side 61a of the wheel 61, it is possible to measure the amount of unbalance located at the other side 61b of the wheel 61. Then, the instantaneous center of vibration changing bodies 6, 6 are made freely rotatable by the above mentioned operating means. Subsequently, the handle 11 is rotated to rotate the instantaneous center of vibration changing bodies 6, 6 in opposite directions, respectively. As a result, the indicating needle 47 secured to the spring supporting body 18 is rotated. The indicating needle 47 is set to the graduated scale so as to locate the instantaneous center of vibration at the point $K_2$.

If the wheel 61 is rotated in the above mentioned manner, the mass and position of the amount of unbalance $m_1$ can be measured. In the same manner, the mass and position of the amount of unbalance $m_2$ can also correctly be measured by means of the imaginary line F.

The indicating needle 47 is secured to the spring supporting body 18, so that the point where the indicating needle 47 and the graduated scale 52 corresponding to the reference line M cross with each other is moved by the same angle in succession. The amount of movement which is proportional to the amount of movement of the point where the two inaginary lines F, F cross with each other is indicated on the graduated scale 52.

For this purpose, one side of the wheel 61, which can easily be known from the position of the wheel mounting disc 33, is marked on the graduated scale 52. If the indicating needle 47 is set to the marked position on the graduated scale 52, the point where the imaginary lines F,F cross with each other is located at one side of the wheel 61. If the indicating needle 47 is set to a position 53a shown in FIG. 17, the point where the imaginary lines F, F cross with each other is located at the instantaneous center of vibration $K_1$ of one side of the wheel 61.

In the embodiment shown in FIG. 10, the spring member is composed of a cylindrical body including two parallel slit-shaped grooves 20, 20 spaced apart from the center of the cylindrical body and each groove being small in width. The cylindrical body is provided at its outer periphery with two longitudinal notches each opposed to each of the grooves 20, 20 so as to form the reduced thickness portions 21, 21.

The invention is not limited to such embodiment only. In a modified embodiment shown in FIG. 13, the cylindrical body is provided at its outer periphery with two pairs of longitudinal grooves 70, 70 extending in parallel with each other at the diametrically opposite positions of the cylindrical body so as to form reduced thickness portions between the slit-shaped grooves 20, 20 and the longitudinal grooves 70, 70.

In another modified embodiment shown in FIG. 14, the cylindrical spring supporting body 71 is provided at its diametrically opposite positions with two flat surfaces 72, 72, respectively, to these flat surfaces are secured plate springs 73, 73 by means of bolts 74. Free ends of these plate springs 73, 73 are secured to the supporting body and made stationary. In a further modified embodiment shown in FIG. 15, the cylindrical spring supporting body is provided at its center with an axial bore 75 which is surrounded by four bores 76, 76, 77, 77 spaced apart from the axial bore 75 and extending in parallel therewith. The bores 76, 76 and 77, 77 are communicated with each other through slit-shaped grooves 78, 79, respectively. Each of the opposed bores 76, 77 is provided at its opposed surfaces with slit-shaped longitudinal grooves 80, 81 so as to form reduced thickness portions 82, 82. As a result, portions adjacent to the axial bore 75 are connected through these reduced thickness portions 82, 82, so that the portions adjacent to the axial bore 75 can freely be rocked due to the elastic property of the reduced thickness portions 82, 82.

In a still further embodiment shown in FIG. 16, the cylindrical spring supporting body is provided at its center with an axial bore 75. At both sides of the axial bore 75 are formed two parallel slit-shaped grooves 20, 20; 20, 20 so as to form reduced thickness portions 21, 21 between respective slit-shaped grooves 20 and 20, respectively.

In FIG. 20 is shown an electric circuit for measuring the amount of unbalance of the wheel and the phase thereof by means of an electric signal generated at the piezoelectric element 42 of the wheel balancer according to the invention.

To an output end of the piezoelectric element 42 is connected a first amplifier circuit 100, to an output end of which is connected a negative feed back amplifier circuit 101 having a variable input resistor 102 which corresponds to the rim width a of the wheel 61. To the variable input resistor 102 is connected a feed back resistor 103 which corresponds to the distance m from the instantaneous center of vibration $K_1$ to the vibration detecting part S which is composed of the piezoelectric element 42 and provided for the rotary shaft 32. Provision is made of change-over switch 104 for forming an inverse amplifier circuit in the case of rotating the rotary shaft 32 about the instantaneous center of vibration $K_1$ at one side located inside of the rim of the wheel 61 and for forming a non-inverse amplifier circuit in the case of rotating the rotary shaft 32 about the instantaneous center of vibration $K_2$ at another side located outside of the rim of the wheel 61.

To an output end of the negative feed back amplifier circuit 101 is connected a variable resistor 105 through a change-over switch 146 adapted to be operated in response to the diameter of the rim of the wheel 61. To the variable resistor 105 is connected through a changeover switch 106 variable resistors 107, 108 connected in parallel and adapted to be interlocked with the amount of unbalance dial at two sides of the wheel 61. To the variable resistors 107, 108 is connected a positive input side of a calculation amplifier circuit 109, to the feed back circuit of which is connected a condenser (not shown) which serves as a filter. To an output end of the calculated amplifier circuit 109 is connected through a changeover switch 138 a schmidt circuit 112. The positive input side of the calculation amplifier circuit 109 is connected through a resistor to the output end thereof. With the schmidt circuit 112 is connected a zero adjusting variable resistor 116.

To an output end of the schmidt circuit 112 is connected through a differentiation circuit 118 a positive clipper circuit 119, to the output end of which is connected a set input end 121 of a flipflop circuit 120. To an output end of the differentiation circuit 118 is connected through a phase detecting change-over switch 122 a negative clipper circuit 123 and an inversion circuit 124 in series. To the negative clipper circuit 123 is connected through a phase detecting change-over switch 122 a light receiving member 46 (FIG. 19) such as a photo transistor and the like. To the inversion circuit 124 is connected a reset input end 125 of the flipflop circuit 120.

In FIG. 21 is shown the flipflop circuit 120 in detail. As shown in FIG. 21, the flipflop circuit 120 is composed of a pair of transistors 126, 127, to a reset output side of which are connected in parallel a condenser 128 and a series connected change-over switch 129 and resistor 130. To the change-over switch 129 is connected a resistor 131 which is different in resistance value from the resistor 130.

To a set output side of the flipflop circuit 120 are connected in parallel a condenser 132 and a variable resistor 133. A ratio of a time constant formed by the condenser 132 and the resistor 133 at the set output side of the flipflop circuit 120 to a time constant formed by the condenser 128 and the resistor 130 at the reset output side of the flipflop circuit 120 is made 1 : 1 and to a time constant formed by the condenser 128 and the resistor 131 closed with the aid of the change-over switch 129 is made different from 1 : 1.

Between the set and reset output ends of the flipflop circuit 120 is connected an indicator 134 which indicates the balanced condition and constitutes a comparison circuit 135.

As shown in FIG. 20, to an output end of the piezoelectric element 42 is connected through a change-over switch 136 an amplifier circuit 100. The change-over switch 136 serves to supply an output signal or alternating current from the piezoelectric element 42 to the amplifier circuit 100.

To an output end of the amplifier circuit 100 is connected through a change-over switch 137 the negative feed back amplifier circuit 101. The change-over switch 137 serves to supply the output signal from the preceding amplifier circuit 100 or alternating current to the negative feed back amplifier circuit 101. To the positive input side of the calculation amplifier circuit 109 is supplied through the change-over switch 146 an output signal or alternating current from the preceding amplifier circuit 101.

The change-over switch 138 connected to the input side of the schmidt circuit 112 serves to supply an output signal or alternating current from the calculation amplifier circuit 109 to the schmidt circuit 112.

To an output end of the schmidt circuit 112 is connected through a differentiation circuit 118 a change-over switch 144 which is connected to a positive clipper circuit 119. The change-over switch 144 serves to supply an output signal or alternating current from the schmidt circuit 112 to the positive clipper circuit 119.

The negative feed back amplifier circuit 101 is connected through a change-over switch 104 to an output side of the amplifier circuit 100. The change-over switch 104 is adapted to be interlocked with the above mentioned fastening tube 4 (FIG. 10), spring receiving member 5, instantaneous center of vibration changing body 6, interlocking rod 13 or spring supporting body 18 and the like of means for changing the instantaneous center of vibration to two sides of the rim of the wheel 61.

The electric circuit shown in FIG. 20 will operate as follows:

The vibration detecting output from the piezoelectric element 42 is amplified at the amplifier circuit 100. If the instantaneous center of vibration $K_1$ at the inside of the rim of the wheel 61 constitutes a vibration center, the change-over switch 104 is changed over so as to effect inversive amplification at the negative feed back amplifier circuit 101. If the instantaneous center of vibration $K_2$ at the outside of the rim of the wheel 61 constitutes a vibration center, the change-over switch 104 is changed over so as to effect non-inversion amplification at the negative feed back amplifier circuit 101. As a result, by changing the instantaneous center of vibration, it is possible to effect amplification at different amplification factors to supply current or voltage which corresponds to the amount of unbalance at both sides of the rim of the wheel through the variable resistor 105, change-over switch 106, variable resistor 107 or variable resistor 108 to the calculation amplifier circuit 109. This input supplied to the calculation amplifier circuit 109 is a voltage or current value corrected by the variable resistor 105 whose resistance value is set beforehand in response to the diameter of rim of the wheel 61. This electric signal in a sine wave signal as shown in FIG. 22(a). If the change-over switch 129 (FIG. 21) is connected to the side of the resistor 130, a pivot point of the seesaw of the comparison circuit 135 is brought into its center condition. As a result, the comparison circuit 135 is in its balanced condition, so that the output from the differentiation circuit 118 is supplied through the positive clipper circuit 119 to the flipflop circuit 120 as a positive part of the sine wave so as to set it. In addition, the output from the differentiation circuit 118 is supplied through the negative clipper circuit 123 and the inversion circuit 124 to the flipflop circuit 120 as a negative part of the sine wave so as to reset and change-over the flipflop circuit 120. The flipflop circuit 120 is brought into set S and reset R by means of the sine wave. The time at which the flipflop circuit 120 is brought into set S is positions designated by even number of $\pi$ such as 0, $2\pi$, $4\pi$ . . . . as shown in FIG. 22(a). The time at which the flipflop circuit 120 is brought into reset R is positions designated by odd number of $\pi$ such as $\pi$, $3\pi$ . . . The time held by the set S is equal to the time held by the reset R. As a result, to an indicator 134 of the comparison circuit 135 connected across the set and reset output ends of the flipflop circuit 120 is applied the same terminal voltage through the resistors 130, 133 whose resistance values are equal with each other, whereby the indicator 134 indicates 0 scale. That is, if the seesaw of the comparison circuit 135 is in its balanced condition, across the comparison circuit 135 is applied the equal inputs. Then, the change-over switch 129 is closed to the different resistor 131.

The resistance value of the variable resistor 133 is made different from the resistance value of the resistor 131. The set S and reset R times determined by the flipflop circuit 120 are made equal with each other. The time constant formed by the condenser 128 and the resistor 131 is different from the time constant formed by the condenser 132 and the resistor 133. As a result, a voltage Va across the resistor 131 is different from a voltage Vb across the resistor 133. This condition is the same as that condition in which equal inputs are applied to each side of the seesaw of the comparison circuit 135 whose pivot point has been changed. The difference between the voltage Va across the resistor 131 and the voltage Vb across the resistor 133 is indicated by the indicator 134, thereby indicating the amount of unbalance of the wheel. This amount of unbalance of the indicator 134 is corrected by the variable resistor 107 or 108. From this amount of correction is counted backwardly the amount of unbalance.

In order to make balance the seesaw whose pivot point has been changed, that is, the condition in which the time constants at each side of the flipflop 120 are different from each other, that part of the seesaw which is, long in length from the pivot point is added with a small input (weight) and that part of the seesaw which is short in length from the pivot point is added with a large input (weight). For this purpose, a ratio of the positive part of the sine wave to the negative part thereof is opposed to a ratio of the long part of the seesaw to the short part thereof. So, the reference line f of the vibration of the sine wave h is displaced to a reference line g as shown in FIG. 22(a). This causes that pulse width which is cut out from the sine wave h by the reference line g to be obtained as a ratio of the set pulse S to the reset pulse R, these set and reset pulses S, R being supplied to the comparison circuit 135 acting as the seesaw circuit. If this ratio of the set pulse S to the reset pulse R is supplied across the flipflop circuit 120, it is possible to know the amount of unbalance from such amount of displacement from the reference line f to the reference line g that the ratio of the set pulse S to the reset pulse R can balance the comparison circuit 135 as the seesaw circuit whose pivot has been displaced.

A practical process of measuring the above mentioned amount of unbalance of the wheel will now be described with reference to FIGS. 23 and 24.

To the variable resistors 107, 108 are connected dials 92 for determining the amount of unbalance, respectively, so as to change the resistance values of the variable resistors 107, 108. This dial 92 for the amount of unbalance is operated by changing over the change-over switch 106. The variable resistor connected to the schmidt circuit 112 serves to define the schmidt level. When the dial 92 for the unbalanced amount is positioned at scale 0, the calculation amplifier circuit 109 is in its normal condition with no drift. As a result, if the unbalance dial 92 is set to zero so as to supply the sine wave to the calculation amplifier circuit 109, the zero position is present at the center of the sine wave vibration as shown in FIG. 23(a). Times elapsed from a point of intersection of this reference line and the sine wave to the next succeeding intersection points alternately become set S time and reset R time in succession. In this case, the set S time is equal to the reset R time. As a result, even though the output voltage and the output time of the flipflop 120 are equal with each other, since the resistance values of the resistors 131, 133 are different from each other and the time constants are also different from each other, the output voltages Va, Vb applied to the indicator 134 become different from each other, thereby deflecting the indicator 134 in the same manner as the seesaw as shown in FIG. 23(c). FIG. 23(c) does not show a pulse wave, but shows the voltages applied to the resistors 131, 133, respectively. That is, FIG. 23(c) does not show the time of a pulse wave. A ratio of the output voltage Va to the output voltage Vb operates in the same manner as a ratio of the set S time to the reset R time.

In the case of returning the deflection of the indicator 134 to zero, correction can be effected by making the output voltages Va, Vb same and the time constant at the set side of the flipflop circuit 120 is different from the time constant at the reset side thereof. As a result, the deflection of the indicator 134 can be returned to zero by changing the time during which the voltage is applied to each resistor 131, 133 with the output voltage made constant.

If the amount of unbalance dial 92 is rotated to change the voltage supplied to the positive side of the calculation circuit 109 as shown in FIG. 24 with the vibration shown in FIG. 23 continued, the 0 position of the sine wave vibration is displaced as shown in FIG. 24(d). As a result, the set S time and reset R time of the flipflop 120 are changed as shown in FIG. 24(e). If a ratio of the set S time to the reset R time becomes equal to a ratio of the output voltage Va to the output voltage Vb, these output voltages are cancelled with each other and hence the indicator 134 indicates 0 scale. In this case, the amount of displacement D from the vibration center shown in FIG. 24(d) shows the amount of unbalance which can directly be read out by reading a numerical value on the scale indicated by the amount of unbalance dial 92. FIG. 24 shows how to obtain the amount of unbalance, the pulse waves shown in FIGS. 24(e) and 24(f) are different from those usable in practice.

If the amount of unbalance is larger or smaller, the amplitude of the sine wave is increased or decreased in dependence with the amount of unbalance. The more the amount of unbalance is, the larger the amplitude becomes. As a result, if the reference line is displaced from its zero line to cause the pulse wave to be cut by the reference line to obtain such amplitude ratio that the comparison circuit 135 as the seesaw circuit composed of the flipflop circuit 120 whose time constant formed by the condenser 128 and the resistor 131 at the reset side is different from the time constant formed by the condenser 132 and the resistor 133, the amounts of displacement $D_1$, $D_2$ from the instantaneous center of vibration are proportional to large and small vibrations. In addition, it is possible to easily know the amount of unbalance by rotating the phase dial 49a (FIG 19).

In the case of measuring the amount of unbalance, the indicator 134 is set beforehand to its zero scale by means of the variable resistor 116 of the schmidt circuit 112. Then, the variable resistor connected to the level setting change-over switch 106 is adjusted to displace the vibration reference 0 position of the unbalanced vibration wave to a schmidt lever Q as shown in FIG. 26. A standard ratio of a length $l_1$ to a length of $l_2$ of the schmidt level Q formed by crossing it by the above mentioned unbalanced vibration wave is defined as a standard ratio when this ratio is formed by crossing the schmidt level Q by that unbalanced vibration wave which is produced when the minimum vibration input is amplified by a maximum amplification factor within a range that can maintain linearlity of the minimum input at the calculation circuit. For example, if a vibration input is larger than the minimum vibration input that can make the ratio of $l_1$ to $l_2$ near 1 : 1, the amplification factor is decreased so as to make the ratio of $l_1$ to $l_2$ equal to the above mentioned ratio. This decreased amount permits to measure the amount of unbalance. That is, the variable resistor of the schmidt circuit 112 can set the schmidt level Q. If the variable resistor 107 or 108 is adjusted by the amount of unbalance dial such that the indicator 134 of the flipflop circuit 120 indicates 0, the resistance value indicated by the amount of unbalance is equal to the amount of unbalance of the wheel. The variable resistor 105 is adjusted beforehand in response to the kind of the wheel and its instantaneous center of vibration position and at the same time the input resistor 102 and the negative feed back resistor 103 of the negative feed back amplifier circuit 101 are adjusted.

In this manner, it is possible to measure the amount of vibration of the wheel and then measure the position thereof.

If the change-over switch 122 is changed over to the light receiving side 46 and the change-over switch is changed over to the variable resistor 116 to set the drift of this circuit to 0 and in addition the change-over switch 129 is changed over to the resistor 130 to set the time constant of the set side and the reset side of the flipflop circuit 120 to 1 : 1, the sine wave input to the schmidt circuit 112 is supplied to the differentiation circuit 118. The sine wave input is differentiated by the differentiation circuit 118. The positive clipper circuit 119 causes the positive triggers shown in FIG. 22(c) to be supplied to the set input end 121 of the flipflop circuit 120. As a result, the flipflop circuit 120 is set to a condition shown in FIG. 22(e).

Next, if the light emitted from the projector 45 (FIG. 19) is interrupted by the phase detecting plate 43 rotating in synchronism with the rotary shaft 32 to emit light to the light receiving part 46 by means of the notch detecting part 42 per one revolution, it is possible to produce a signal shown in FIG. 22(d). This signal is supplied to the reset input end 125 to reset the flipflop circuit 120. This causes the set S time and the reset R time to form a rectangular wave as shown in FIG. 22(e). The fact that the indicator 134 indicates 0 scale means that the set S time is equal to the reset R time. That is, the pulse signal shown in FIG. 22(d) is just positioned at the center between the two adjacent set signals shown in FIG. 22(c). The time I of generating the signal shown in FIG. 22(d) can be displaced to the center II between the two adjacent trigger signals shown in FIG. 22(c) by selectively changing over the change-over switches 104, 106, 122, 129 by means of the side of the wheel 61 to be measured and by moving the phase dial 49a and rotating the phase angle 44. This center position II is memorized by the dial 49b. At this time, the maximum amplitude position of the sine wave shown in FIG. 22(a) is positioned foreward by 90° from the signal generating time II shown in FIG. 22(d). This maximum amplitude position of the sine wave is a position at which the amount of unbalance is present. This position can directly be read out by that scale of the phase dial 49a which corresponds to the zero position of the indicator 134 obtained by rotating the phase angle 44. If the amount of unbalance obtained by the above mentioned series of operations is $m_1$ or $m_2$, the mass which is the same as the amount of unbalance $m_1$ or $m_2$ is secured to a position opposed to that position of the rim surface where the amount of unbalance $m_1$ or $m_2$ is present, the unbalance of the rim surface becomes absent.

In the case of detecting the phase of the unbalanced amount $m_2$ about the instantaneous center of vibration $K_1$, for example, in the above mentioned manner, then the instantaneous center of vibration of the rotary shaft 32 is changed over to the instantaneous center of vibration $K_2$ so as to continue the vibration and measure the amount of vibration $m_1$ at one side of the wheel. The same mass is secured to a position opposed to that position of the rim surface where the amount of unbalance $m_1$ is present to correct the unbalance between the two sides of the wheel 61.

A process of correcting the calculation circuit of the above mentioned wheel balancer will now be described.

Each of the above mentioned change-over switches 136, 137, 146, 138, 144 is of a push button type switch as shown in FIG. 27. Above a push button 86 of each of these change-over switches 136, 137, 138, 144, and 146 are positioned the above mentioned drift correction variable resistor 147 of the amplifier circuit 100, the drift correction variable resistor 148 of the negative feed back amplifier circuit 101, the drift correction variable resistor 141 of the calculation circuit 109, the drift correcting variable resistor 116 of the schmidt circuit 112 and the variable resistor 133 of the flipflop circuit 120. Each of these variable resistors 116, 133, 141, 147, 148 is secured to a front free end of an elastic piece whose rear end is secured to the base plate. Each of these variable resistors 116, 133, 141, 148 is provided with an adjustable shaft 88 which can be operated to urge the elastic piece 87 against each of the change-over switches 136, 137, 138, 144, 146 so as to change over it. As a result, to the succeeding amplifier circuit 100, negative feed back amplifier circuit 101, negative input side of calculation amplifier circuit 109, schmidt circuit 112 and flipflop circuit 120 is applied a sine wave of an alternating current whose voltage is adjusted to be matched with each of the above mentioned circuit in place of the vibrating signal of the piezoelectric element 42. If the pressure subjected to the phase button 86 is released, each of the change-over switches 136, 137, 138, 144, 146 is returned to its original position.

In the first place, in the case of adjusting the variable resistor 133 of the comparison circuit to the reference value, the change-over switch 144 is changed over so as to apply a sine wave to the positive clipper circuit 119, negative clipper circuit 123, inversion circuit 124 and set aside and reset side of the flipflop circuit 120 in succession. Then, the variable resistor 133 is so adjusted that the indicator 134 of the comparison circuit 135 indicates 0 scale. As above mentioned, the comparison circuit 135 is adjusted at the first time, this adjustment being the basic one.

Next, in the case of adjusting the preceding variable resistor 116, the change-over switch 138 is changed over. In this case, the change-over switch 144 is changed over to its original position, so that the sine wave is applied from the schmidt circuit 112 to the succeeding stages and the variable resistor 116 is adjusted until the indicator 134 indicates the 0 scale as in the above mentioned manner.

In addition, the preceding variable resistor 141 is adjusted such that the indicator 134 is operated by the sine wave applied from the calculation amplifier circuit 109 to its succeeding stages when the change-over switch 138 is changed over to cause the indicator 134 to indicate the 0 scale.

In addition, the variable resistor 148 is adjusted such that the indicator 134 operated by the sine wave applied from the negative feed back amplifier circuit 101 to the succeeding circuits when the change-over switch 137 is changed over is deflected to the 0 scale.

Finally, in the case of adjusting the variable resistor 147, the change-over switch 136 is changed over to apply the sine wave to the calculation circuit as a whole, the variable resistor 147 being adjusted so as to cause the indicator 134 to indicate the 0 scale.

In the manner as described above, the pulse comparison circuit 135 is capable of correcting the drift of each stage circuit.

A process of correcting the drift of each stage circuit by means of the pulse comparison circuit 135 will now be described.

To the disc 33 is mounted the wheel 61 and a distance $m$ from that side of the wheel on which the correcting weight is mounted to the detecting element is measured with the aid of a guage. This distance $m$ is set by the variable resistor 103. Then, the width a of the wheel is measured to set the variable resistor 102. The handle 55 is rotated to align the instantaneous center of vibration with the inside of the rim while observing the pointer 47. Then, the change-over switch 106 is changed over to the inside amount of unbalance variable resistor 107. The motor is energized to rotate the wheel. Then, the dial 92 is rotated until the zero indicator 134 indicates zero, thereby moving the slide contact of the inside amount of unbalance variable resistor 107. At the same time, the phase detecting changeover switch 122 interlocked with the phase dial 49a is changed over.

The phase dial 49a is rotated to cause the zero scale indicator 134 to indicate zero.

The scale thus obtained is provided for the memory dial 49b.

Then, the handle 55 is rotated so as to displace the instantaneous center of vibration to the outside of the wheel. The change-over switch 106 is changed over to the outside amount of unbalance variable resistor 108. The dial for this change-over switch 106 serves to memory the outside amount of unbalance. Then, the slide contact of the outside amount of balance variable resistor 108 is moved until the zero scale indicator 134 indicates its zero scale, whereby the phase is measured.

What is claimed is:

1. A wheel balancer comprising a wheel having an amount of unbalance to be measured, a base, a rotary shaft for rotatably mounting said wheel thereon, an instantaneous center of vibration of said wheel being movable along a center axis of said rotary shaft, a pair of supporting shafts for supporting said rotary shaft, a rocking body connected between said rotary shaft and said pair of supporting shafts, said supporting shafts being transverse to said rotary shaft and located on a circle having a center which is coincided with said instantaneous center of vibration of said wheel and arranged at both sides of said rotary shaft, a pair of spring-receiving bodies mounted on said base, and a pair of spring members for holding said supporting shafts, respectively, each spring member being disposed within a spring-receiving body, each spring member having one end spaced apart from its associated said supporting shaft and connected thereto and another end secured to its associated said supporting shaft and made stationary to its associated spring-receiving body, each of said supporting shafts being movable in a direction of a tangent touching said circle as said instantaneous center of vibration moves along said axis of said rotary shaft, whereby said amount of unbalance is measured from the amount of vibration of said wheel.

2. A wheel balancer as claimed in claim 1, wherein each of said spring members is composed of a cylindrical elastic body having a pair of a slit-shaped grooves, said grooves extending in parallel with an axial direction of said elastic body and equally spaced apart fron a center axis of said elastic body and forming near thin fronts ends reduced thickness portions.

3. A wheel balancer as claimed in claim 1, wherein each of said spring members is composed of a cylindrical elastic body having a pair of a slit-shaped grooves, said grooves extending in parallel with an axial direction of said elastic body and equally spaced apart from a center axis of said elastic body, said elastic body being provided at its outside surface with longitudinal grooves spaced apart from each other, said longitudinal grooves and said pair of slit-shaped grooves forming reduced thickness portions therebetween.

4. A wheel balancer as claimed in claim 1, wherein each of said spring members is composed of a cylindrical elastic body provided at its diametrically opposite positions with flat surfaces, and a pair of plate springs each having one end secured to said flat surface and another free end secured to said supporting shaft.

5. A wheel balancer as claimed in claim 1, wherein each of said spring members is composed of a cylindrical elastic body provided at its center with an axial hole and at portions surrounding said axial bore with bores extending through said elastic body and spaced apart from said axial hole, two longitudinally adjacent bores being communicated through a slit-shaped groove and two laterally adjacent bores being provided at their opposed portions with longitudinal grooves, thereby forming reduced thickness portions.

6. A wheel balancer as claimed in claim 1, wherein each of said spring members is composed of a cylindrical elastic body provided at its center with an axial hole and at portions opposed to both sides of said axial hole with two parallel slit-shaped grooves, said slit-shaped grooves forming reduced thickness portions therebetween.

7. A wheel balancer as claimed in claim 1 and comprising further an indicating means movable in proportion to the amount of movement of said instantaneous center of vibration and detecting the position of said instantaneous center of vibration.

8. A wheel balancer as claimed in claim 1 and comprising further a calculation circuit for detecting an amount of vibration of said wheel to detect said amount of unbalance and its phase of said wheel, means for setting a schmidt level of said calculation circuit, an amplifier circuit for amplifying a minimum input signal to a largest possible extent, means for decreasing an amplification factor of said amplifier circuit such that a ratio of lengths formed between four points where an amplified wave form of said minimum input signal and a schmidt level cross with each other is equal to a ratio of lengths formed between four points where an input signal depending on an amount of vibration of said wheel and said schmidt level cross with each other, and means for detecting an amount of unbalance by said decrease of said amplification factor.

9. A wheel balancer as claimed in claim 8, wherein said calculation circuit comprises a series of stages each constituting a circuit, a comparison circuit constituting the last stage of said calculation circuit and including an indicator, a change-over switch disposed between said stages and opened and closed such that a sine wave or reference wave is supplied to preceding stages from succeeding stages instead of an input from preceding stages, whereby said sine waves or reference waves are compared by said comparison circuit so as to correct said stages.

10. A wheel balancer as claimed in claim 1, wherein said calculation circuit comprises as one of said series of stages a feedback amplifier circuit including a feed back resistor defined by a distance from a vibration detecting part of said rotary shaft to that side of said wheel on which is mounted a correction weight and an input resistor defined by a rim width of said wheel, said feed back amplifier circuit being supplied with an electric signal generated at said vibration detecting part and changed over to an inversion amplifier circuit and a non-inversion amplifier circuit.

* * * * *